Sept. 29, 1970     E. C. UBERBACHER     3,530,699
METHOD OF IMPROVING THERMOFORMED COMPONENTS
Filed July 15, 1968     2 Sheets—Sheet 1
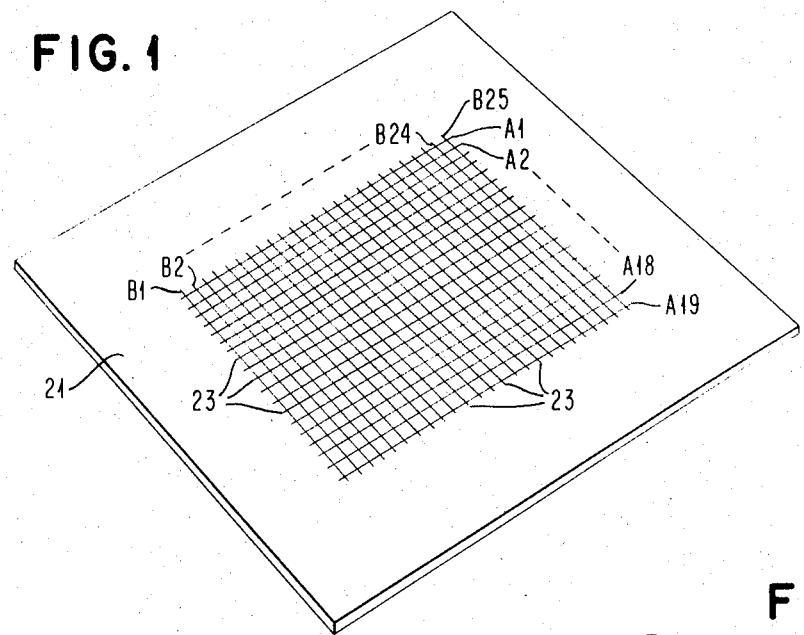
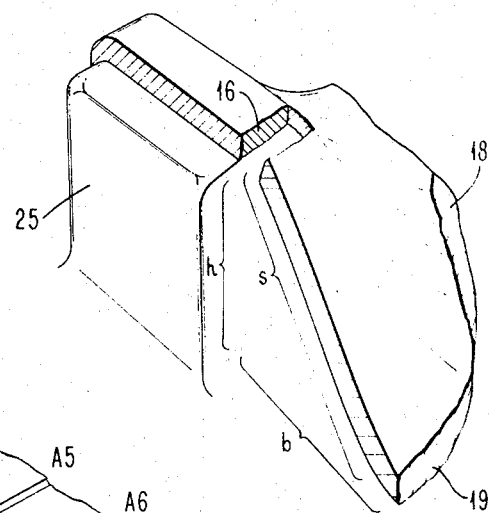
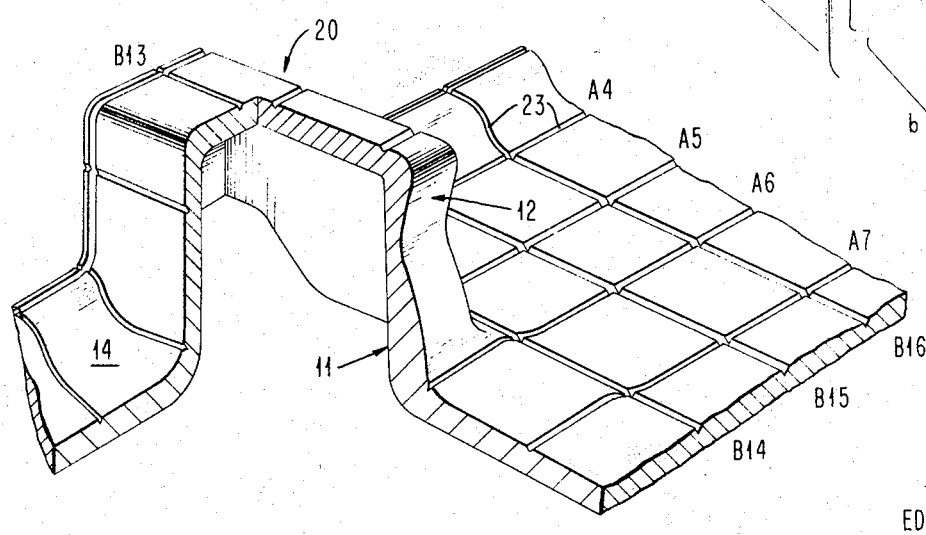
INVENTOR
EDWARD C. UBERBACHER
BY *Harold H. Sweeney Jr.*
ATTORNEY

United States Patent Office 3,530,699
Patented Sept. 29, 1970

3,530,699
METHOD OF IMPROVING THERMOFORMED COMPONENTS
Edward C. Uberbacher, Poughkeepsie, N.Y., assignor to International Business Machines Corporation, Armonk, N.Y., a corporation of New York
Filed July 15, 1968, Ser. No. 744,909
Int. Cl. B21d 26/04
U.S. Cl. 72—60
5 Claims

ABSTRACT OF THE DISCLOSURE

Thin wall areas of a component made by a pressure deformation process are eliminated by forming a test component from a material sheet of uniform thickness and determining from the component thus formed the location and extent of the thin wall areas. A die is formed having indentations at a location and of a depth which corresponds, respectively, to the location and extent of the wall thinning on the test component. Further material sheets are formed against the indented die so as to preform material sheets with extra thickness areas determined by the indentations in the die. Each of these preformed material sheets, when formed the same as the test component, provide a component having substantially equal thickness walls throughout.

---

This invention relates to a method for providing improved components from a pressure deformation process and, more particularly, to a method of performing the material sheets to provide components which have substantially equal thickness walls throughout.

U.S. Pat. 3,340,101 issued Sept. 5, 1967, assigned to International Business Machines Corporation sets forth a method of shaping and deforming metals which are characterized as being hyperextensible and are identified by the presence of a substantial strain rate sensitivity. The process is similar to that used in the plastic and glass industries for stretching or tensile deforming various polymers, silicates and like non-metallic materials. The basic process employed utilizes a die having a shape that is substantially complementary to the shape desired to be produced. The material to be formed is placed adjacent the die and deforming force is applied causing the material to stretch and deform into and/or around the die, including such detailed contours and complex curvatures as may be required.

The components produced using this or a similar pressure deformation process give rise to excessive material thinning in certain areas. The material thinning takes place in areas where the tool or die geometrics produce stress concentrations in the formed components. As a result, excessively thin walls occur in these stress areas. Various tool modifications have been made to minimize wall thinning. However, it has been found that the wall thinning can only be completely eliminated by the improved method of the present invention wherein the material sheets are preformed or thickened at the stress areas prior to the component manufacture.

This new method of eliminating wall thinning has been successfully applied in connection with the forming of components from the above mentioned metal, i.e., materials having characteristics which have come to be known as superplasticity. However, the method is not limited thereto but is applicable to polymers, silicates and like non-metallic materials.

It is the principal object of the present invention to provide a method for producing a manufactured component in which wall thinning has been eliminated.

It is another object of the present invention to provide a method for accurately preforming sheet stock.

It is a further object of the present invention to provide a method by means of which thin walled areas may be easily identified.

It is another object of the present invention to provide a method for predetermining the location and the thickness of preformed sheet stock which when pressure deformed will produce uniform wall thicknesses in the resulting component.

Briefly, manufactured components having substantially uniform wall thicknesses may be produced by a pressure deformation means from stock sheets having a plasticity characteristic by forming a test component by a pressure deformation means from a material sheet of uniform thickness. The areas where wall thinning has taken place may be determined from the test component. A die is then made having indentations or contours therein which correspond to the areas on the stock sheet giving rise to the thin wall areas of the test component. The depth of the indentations is likewise determined by the amount of thinning that has taken place at the respective areas on the test component. Further stock sheets are then heated and pressure deformed into the die so as to produce stock sheets having additional thickness areas corresponding to the indentations in said die. These preformed stock sheets are formed into products by pressure deformation means thereby producing products having walls of uniform thickness.

The foregoing and other objects, features and advantages of the invention will be apparent from the following more particular description of a preferred embodiment of the invention, as illustrated in the accompanying drawings.

FIG. 1 is a perspective view of a section of sheet stock containing scribed lines in a grid arrangement.

FIG. 2 illustrates a partly formed section of the component.

FIG. 3 is a partially sectioned diagram of a portion of a test component produced from a stock sheet having scribed lines thereon in a grid pattern.

Figure 4:
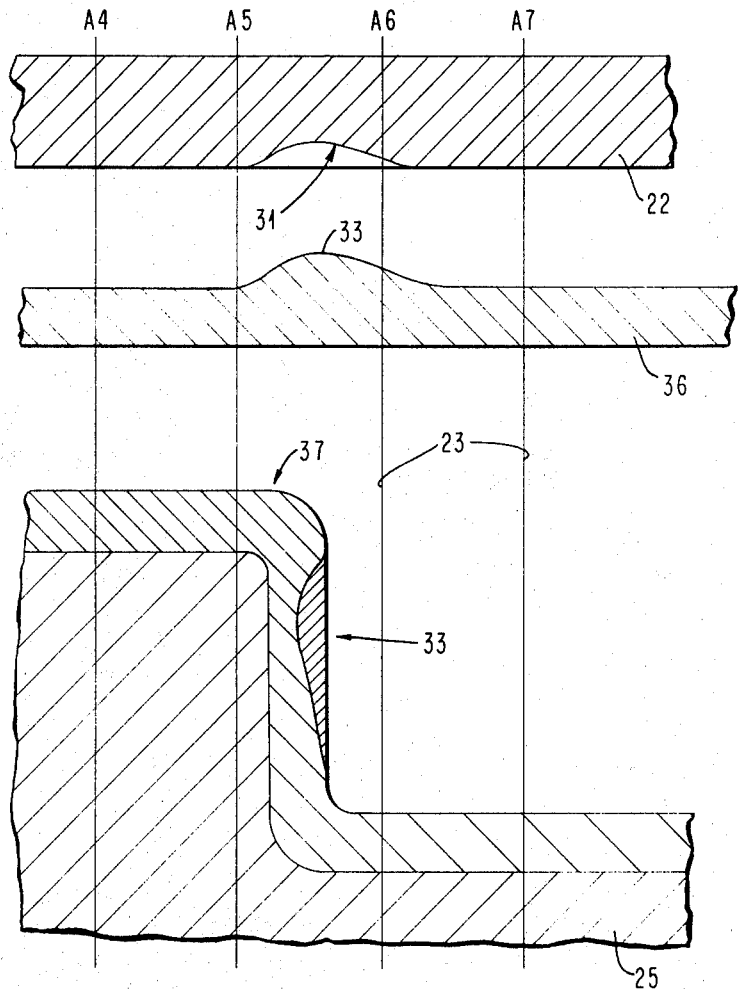
FIG. 4 is an illustration of how the scribed lines in the grid pattern can be used to determine the area to be contoured in the preform die.

The material used to demonstrate the usefulness of this invention was a metallic alloy of 78% zinc and 22% aluminium. This particular material was selected because of its hyperextensibility characteristic or the ability to undergo extra large extension without necking failure. The extent to which any material so selected can be extended is predictable in general terms from a determination of its strain rate sensitivity and a design determination of the permissable variation in wall thickness. Strain rate sensitivity can be defined as $m$, wherein:

$$m = \frac{d \ln \sigma}{d \ln \dot{\epsilon}}$$

and $\sigma$ is stress in pounds per square inch and $\dot{\epsilon}$ is strain rate in reciprocal minutes. Strain rate sensitivity is readily determined by a simple and now well recognized torsion test described in the article, "Determination of Strain Hardening Characteristics by Torsion Testing," by D. S. Fields, Jr., and W. A. Backofen, published in the proceedings of the ASTM, 1957, vol. 57, pages 1259–1272. Maximum strain rate sensitivity in metals is seen to occur, if at all, as metals are deformed while in a metastable state near the phase transformation boundary. Accordingly, the temperature immediately below the temperature boundary between the phases in question can be expected to produce the greatest strain rate sensitivity.

Once a material having the desired characteristics is selected, a die body must be designed which is complementary to the shape desired to be formed. A stock sheet 21 of the selected material is obtained of a size compatible with the die to which the sheet material is to conform. Equally spaced sets of parallel lines 23 are scribed on the stock sheet 21 in a grid arrangement. As shown in FIG. 1, the grid lines 23 are arranged to define equal area squares within the grid arrangement. It will be appreciated that the areas confined within the lines of the grid arrangement do not necessarily have to be square. It is only important that the areas be sufficiently similar so that any subsequent distortion thereof can be easily recognized and measured. Each of the scribed lines 23 are appropriately labeled so that any particular square can be identified. For example, referring to FIG. 1, the lines shown in one set of parallel grid lines are labeled A1–A19 and the lines shown at right angles thereto in the grid arrangement are labeled B-1–B25. The stock sheet 21 is appropriately located with respect to the die 25 in the forming apparatus so that the sheet stock of material can be appropriately deformed to the shape required by the die. The process as set forth in U.S. Pat. 3,340,101 describing the thermoforming of metals is considered to be the best example of a process for use in connection with this invention. The scribed stock sheet material is fluid pressure loaded so that the stock sheet will be deformed into the shape defined by the die.

A particular section of the test component formed in the apparatus is shown in FIG. 3. This particular section would be formed by a male portion 25 of the die about which the sheet stock 21 forms. As can be seen in the figure, the wall 11 has an area 12 just below the top radius where the wall is excessively thin. As previously mentioned, the object of this invention is to eliminate wall thinning and to produce a manufactured product in which the walls are substantially of equal thickness. It will be appreciated that the hump 14, if of the appropriate height and width, will prevent excessive thinning from taking place in the wall thereabove. However, there are many desired shapes in which such a hump is not acceptable. The stress area 12 just below the top radius causes the alloy metallic sheet to thin from .080″ to .010″.

FIG. 2, shows a partially formed section wherein the alloy material is stretching to form about a male portion of the die 25. This figure shows the forces which produce the excessively thin wall section. The sectional area 16 is considerably less than the combined areas of 18 and 19. The increase in material length $b$ and $h$ required to complete the formation must be obtained from the length $s$. The cross sectional area 16 being smaller than areas 18 and 19 produces a highly concentrated stress area, and thinning occurs. If the cross sectional area 16 equals the combined areas 18 and 19, the stress would also be equal and a uniform wall thickness would result.

Referring again to FIG. 3, in particular to the scribed lines 23 on the section of the component shown, it can be readily seen that the thin wall area 12 is readily identifiable by the stretching or distortion of the square in which the thin wall area 12 exists. The stretching of the square is between lines A5 and A6. The extent of the thinning can be determined as a result of the amount of separation of the lines or distortion of the area of the square. Scribing of the lines 23 is not necessarily limited to scratching the lines on the surface of the stock sheet 21, but various means of marking can be devised. For example, a commercially available quick-drying waterproof marker was utilized which left sufficiently good lines 23 on the test component 20. The only limitation on materials used for lines is that the material is able to withstand the large amount of heat generated during forming.

FIG. 4 illustrates the relationship of the scribed lines 23 to the preforming die 22, the preformed stock sheet 36 and the finished product 37. Once the area of wall thinning has been determined by the distortion of the squares in the grid arrangement, the same grid arrangement can be utilized with respect to the preforming die 22 to locate the area from which the thin wall area 12 on the test component 20 was formed. In other words, the squares which are distorted on the test component 20 are located on the preform die 22 by means of the undistorted grid arrangement. For example, on FIG. 4, the portion of the preform tool 22 is shown having a particular contour 31 located therein substantially between the original grid lines A5 and A6. It is also noted that this area on the preform tool would fall between the lines B13 and B14 as shown in FIG. 3. Once the area for the contour is correctly located in the preform die 22, the contour 31 is made to a depth which corresponds with the amount of distortion found in the grid line arrangement on the test component 20. The contoured die 22 is then utilized to preform a sheet stock of the alloy. As can be seen from FIG. 4, the lobe 33 of the alloy is formed on the sheet stock 36 at the same location and of a height determined by the contour 31 in the preform die 22. Actually, the preform die 22 and the backing plate (not shown) can be heated to a desired temperature so that when the preform die 22 is pressed against the stock sheet between it and the backing plate, the heat causes the alloy near the surface to easily deform into the cavity or contour 31. The added thickness 33 in the predetermined areas of the sheet stock, when utilized in a pressure deforming operation, gives rise to a product 37 in which the wall thinning is eliminated. For example, in FIG. 4, the added material 33 is shown in shaded form to indicate the location of the material added to the sheet stock after forming into the product 37.

The advantages of preforming the stock sheet to reduce wall thinning can be readily appreciated, however, the preforming has many other advantages and can serve other purposes. For example, many features may be required on the component, which cannot be formed by a pressure deformation process such as by vacuum forming but can be produced by preforming. Thick sections required for tapped holes, strengthening ribs, machining bosses, etc. can be obtained through preforming.

Figure 5:
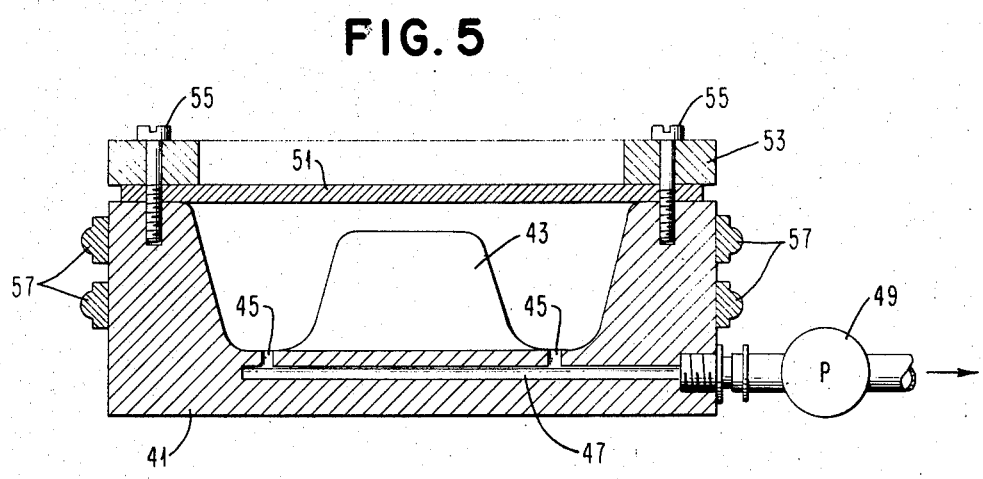
FIG. 5 is a schematic cross sectional view of a typical apparatus employed in performing the pressure deformation operations in the method of this invention.

Typical basic apparatus is shown in FIG. 5 for pressure deformation or vacuum forming of stock sheets into a desired component. The apparatus includes a die body 41 defining a die surface 43 formed complementary to the shape desired to be formed. The die surface 43 is provided at corners and edges and along the bottom with vents or bleed holes 45 preferably each having a diameter that is small with respect to the thickness of the material coming in contact therewith. A vacuum connection 47 is made from the vents 45 to suitable pump means 49 for evacuating the cavity of the die surface to apply a fluid pressure loading across the stock sheet 51 to be deformed. It will be appreciated that deforming pressure could be provided by the application of positive pressure on the stock sheet with equally successful results. The important factors in loading the sheet are (1) the provision of venting means wherever female shaping member contours are likely to result in entrapped space by the sheet, either initially or as it moves; and (2) the loading during at least some portion of the process be applied through a fluid interface.

Clamping or periphery constraining means 53 is employed to grip and effectively constrain a single continuous edge of the stock sheet to assure that the final part will be stretched rather than drawn. Tightening means shown conveniently as bolts 55 are provided for securing the clamping means 53 to the die body. In vacuum processes, it is ordinarily desirable to surround the die body with heating means 57 for the same purpose. However, such heating is not essential to the more general application of the process since the sheet material can be deformed at a sufficiently high rate, as compared to the rate of heat transfer therefrom, that continued addition of heat or direct prevention of heat transfer is not required.

It will be appreciated that materials having the proper extensibility and plasticity such as some plastics, glass, and metallic alloys having superplastic characteristics can be pressure deformed into products having substantially equal thickness walls throughout by utilizing the method of this invention.

While the invention has been particularly shown and described with reference to a preferred embodiment thereof, it will be understood by those skilled in the art that various changes in form and detail may be made therein without departing from the spirit and scope of the invention.

What is claimed is:

1. A method for producing a metal component having substantially uniform wall thicknesses from a pre-formed metallic blank which exhibits effective strain rate sensitivity comprising the steps of:
   providing a shaping member having a surface formed complementary to the shape desired to be formed;
   providing a metal blank having two opposed principle surfaces and being conditionable to exhibit effective strain rate sensitivity;
   conditioning said blank metal to exhibit its effective strain rate sensitivity;
   scribing an identifiable pattern of lines on the upper surface of said metal blank;
   locating said metal blank with respect to said shaping member by positioning said metal blank with its principal opposed surfaces in operative projection with respect to said shaping member, the surface containing the scribed lines being furthest from said shaping member;
   inducing tensile stress in said metal blank by applying a fluid pressure loading across said principal surfaces thereof, for a substantial period of time inversely related to the induced tensile stress, causing said blank member to deform against, and into intimate contact with, said shaping member to form a test component;
   determining from the component formed the areas where thinning of said walls has taken place and the extent thereof by noting the deviation of the scribed lines from the original pattern;
   forming a die having indentations therein at the locations of the areas on the metal blank giving rise to said thin wall areas and of a depth corresponding to the extent of said wall thinning;
   heating a second metal blank which has been conditioned to exhibit its effective strain rate sensitivity;
   pressing said die against said second metal blank so that the material of the blank will flow into said indentations in said die thereby forming a pre-formed metal blank; and
   forming a component from said pre-formed metal blank corresponding to said test component using the same method thereby producing a component having walls of uniform thickness.

2. The method according to claim 1, wherein the step of scribing an identifiable pattern of lines comprises:
   scribing a first set of equally spaced parallel lines on the upper surface of said material sheet;
   scribing a second set of equally spaced parallel lines onto the upper surface of said material sheet at right angles to said first equally spaced parallel lines, the equal spacing of said first and second set of equally spaced parallel lines being equal thereby forming a grid pattern of equal area squares;
   determining after the forming by the pressure deformation step where wall thinning on the component occurs by noting what squares have deviated from said equal area and the extent of the deviation;
   forming said indentation in said die at the locations of the squares in said grid pattern which have deviated from said equal areas and of a depth which corresponds to the amount of deviation.

3. The method according to claim 1, wherein the identifiable pattern of lines is scribed by scratching on the surface of the material sheet.

4. The method according to claim 1, wherein the identifiable pattern of lines is scribed by marking with a material such as crayon which is capable of withstanding the high heat generated in the pressure deformation step.

5. A method according to claim 1, wherein said second metal blank is preformed by placing said second metal blank on a backing plate, applying heat and pressure deforming said second metal blank against said indented die.

References Cited

UNITED STATES PATENTS

| 598,800 | 2/1898 | Meyer | 113—120 |
| 3,144,974 | 8/1964 | Eichner et al. | 113—120 |
| 3,298,893 | 1/1967 | Allen | 264—97 |
| 3,340,101 | 9/1967 | Fields et al. | 72—364 |
| 3,349,739 | 10/1967 | Griese | 113—120 |
| 3,445,168 | 5/1969 | Zandman et al. | 356—32 |

OTHER REFERENCES

"Design For Drawing Aluminum," by J. W. Lengbridge; pp. 28, 30, 31, 34, and 42 of Modern Metals; September 1962.

RICHARD J. HERBST, Primary Examiner

U.S. Cl. X.R.

72—364, 700; 113—120; 264—92, 219